(12) United States Patent
Takaki et al.

(10) Patent No.: US 11,248,537 B2
(45) Date of Patent: Feb. 15, 2022

(54) GAS TURBINE CONTROL DEVICE, GAS TURBINE PLANT, AND GAS TURBINE CONTROL METHOD

(71) Applicant: Mitsubishi Hitachi Power Systems, Ltd., Kanagawa (JP)

(72) Inventors: Kazushige Takaki, Tokyo (JP); Akihiko Saito, Tokyo (JP); Ryuji Takenaka, Yokohama (JP); Koshiro Fukumoto, Yokohama (JP); Yoshifumi Iwasaki, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 247 days.

(21) Appl. No.: 16/484,254

(22) PCT Filed: Feb. 22, 2018

(86) PCT No.: PCT/JP2018/006436
§ 371 (c)(1),
(2) Date: Aug. 7, 2019

(87) PCT Pub. No.: WO2018/155552
PCT Pub. Date: Aug. 30, 2018

(65) Prior Publication Data
US 2019/0383222 A1 Dec. 19, 2019

(30) Foreign Application Priority Data
Feb. 23, 2017 (JP) .............................. JP2017-032682

(51) Int. Cl.
*F02C 9/28* (2006.01)

(52) U.S. Cl.
CPC .......... *F02C 9/28* (2013.01); *F05D 2270/303* (2013.01)

(58) Field of Classification Search
CPC ..................................... F02C 9/28; F02C 9/26
See application file for complete search history.

(56) References Cited

U.S. PATENT DOCUMENTS 4,258,545 A * 3/1981 Slater ..................... F02C 9/00
   60/226.1
5,081,830 A * 1/1992 Schwarz .................. F02C 9/16
   60/782

(Continued)

FOREIGN PATENT DOCUMENTS

CN   101566105   10/2009
CN   105849389    8/2016

(Continued)

OTHER PUBLICATIONS

International Search Report dated May 22, 2018 in corresponding International (PCT) Patent Application No. PCT/JP2018/006436, with English Translation.

(Continued)

*Primary Examiner* — Todd E Manahan
*Assistant Examiner* — Thuyhang N Nguyen
(74) *Attorney, Agent, or Firm* — Wenderoth, Lind & Ponack, L.L.P.

(57) ABSTRACT

A gas turbine control device includes a first estimation unit configured to estimate a first temperature which is a first turbine inlet temperature estimation value based on a first model which is a physical model using a fuel flow rate to a gas turbine; a second estimation unit configured to estimate a second temperature which is a second turbine inlet temperature estimation value based on a second model which is a physical model using an exhaust gas temperature of the gas turbine; and a correction unit configured to correct the first temperature based on the second temperature to calculate a third turbine inlet temperature estimation value.

12 Claims, 5 Drawing Sheets

(56) References Cited

U.S. PATENT DOCUMENTS

| | | | | |
|---|---|---|---|---|
| 7,707,814 B2* | 5/2010 | Sonoda | ............... | F02C 9/28 60/39.281 |
| 7,756,626 B2* | 7/2010 | Fujii | ............... | F02C 9/28 701/100 |
| 8,914,265 B2 | 12/2014 | Zhang et al. | | |
| 2002/0106001 A1* | 8/2002 | Tomlinson | ............... | F02C 9/28 374/144 |
| 2004/0237503 A1* | 12/2004 | Irwin | ............... | F02C 9/26 60/204 |
| 2009/0271085 A1 | 10/2009 | Buchalier et al. | | |
| 2010/0300062 A1* | 12/2010 | Ewens | ............... | F01D 17/08 60/39.24 |
| 2012/0036861 A1* | 2/2012 | Seely | ............... | F02C 9/28 60/776 |
| 2016/0326967 A1 | 11/2016 | Yamamoto et al. | | |
| 2017/0211409 A1 | 7/2017 | Saito et al. | | |
| 2019/0063335 A1 | 2/2019 | Takaki et al. | | |

FOREIGN PATENT DOCUMENTS

| | | |
|---|---|---|
| JP | 2001-329855 | 11/2001 |
| JP | 2005-240608 | 9/2005 |
| JP | 2012-002126 | 1/2012 |
| JP | 2016-023604 | 2/2016 |
| JP | 2016-44654 | 4/2016 |
| JP | 2017-160843 | 9/2017 |

OTHER PUBLICATIONS

Written Opinion of the International Searching Authority dated May 22, 2018 in corresponding International (PCT) Patent Application No. PCT/JP2018/006436, with English Translation.

* cited by examiner

GAS TURBINE CONTROL DEVICE, GAS TURBINE PLANT, AND GAS TURBINE CONTROL METHOD

CROSS-REFERENCE TO RELATED APPLICATION

Priority is claimed from Japanese Patent Application No. 2017-32682, filed Feb. 23, 2017, the content of which is incorporated herein by reference.

TECHNICAL FIELD

The present invention relates to a gas turbine control device, a gas turbine plant, and a gas turbine control method.

BACKGROUND ART

In some cases, a turbine inlet temperature may be used to control a gas turbine. In contrast, in some cases, an inlet of a gas turbine reaches a high temperature, and it is difficult to measure the turbine inlet temperature with high accuracy. Therefore, techniques for estimating a turbine inlet temperature are proposed. For example, Japanese Unexamined Patent Application, First Publication No. 2005-240608 describes a technique for estimating a turbine inlet temperature on the basis of a heat balance in a combustor of a gas turbine.

SUMMARY OF INVENTION

Technical Problem

By estimating a turbine inlet temperature on the basis of a heat balance in a combustor, responsiveness in a transition period can be ensured. Furthermore, if the estimation accuracy of the turbine inlet temperature can be enhanced, the control accuracy of the gas turbine can be enhanced.

The present invention provides a gas turbine control device, a gas turbine plant, and a gas turbine control method capable of securing responsiveness for estimation of a turbine inlet temperature and enhancing the estimation accuracy.

Solution to Problem

According to a first aspect of the present invention, a gas turbine control device includes a first estimation unit configured to estimate a first temperature which is a turbine inlet temperature estimation value based on a first model which is a physical model using a fuel flow rate to a gas turbine; a second estimation unit configured to estimate a second temperature which is a turbine inlet temperature estimation value based on a second model which is a physical model using an exhaust gas temperature of the gas turbine; and a correction unit configured to correct the first temperature on the basis of the second temperature to calculate a turbine inlet temperature estimation value.

The first estimation unit may estimate the first temperature on the basis of the first model indicating a heat balance in a combustor, the second estimation unit may estimate the second temperature on the basis of the second model indicating a heat balance using an exhaust gas temperature of the gas turbine, and the correction unit may correct the first temperature using a correction coefficient determined on the basis of a ratio between the first temperature and the second temperature.

The gas turbine control device may include an input value correction unit configured to correct at least one of estimation values to be input to the first model using an estimation value obtained by the calculation using the second model.

According to a second aspect of the present invention, a gas turbine plant includes the gas turbine control device described above.

According to a third aspect of the present invention, a gas turbine control method includes estimating a first temperature which is a turbine inlet temperature estimation value based on a first model which is a physical model using a fuel flow rate to a gas turbine; estimating a second temperature which is a turbine inlet temperature estimation value based on a second model which is a physical model using an exhaust gas temperature of the gas turbine; and correcting the first temperature on the basis of the second temperature to calculate a turbine inlet temperature estimation value.

Advantageous Effects of Invention

According to the gas turbine control device, the gas turbine plant, and the gas turbine control method described above, it is possible to ensure responsiveness for estimation of the turbine inlet temperature and to improve the estimation accuracy.

EMBODIMENTS FOR CARRYING OUT THE INVENTION

Hereinafter, embodiments of the present invention will be described, but the following embodiments do not limit the invention according to the claims. Moreover, not all combinations of features described in the embodiments are essential for the solution of the invention.

First Embodiment

Figure 1:
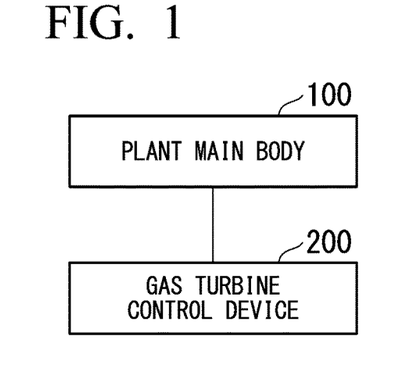
FIG. 1 is a schematic block diagram illustrating a functional configuration of a gas turbine plant according to a first embodiment.

FIG. 1 is a schematic block diagram illustrating a functional configuration of a gas turbine plant according to the first embodiment. As illustrated in FIG. 1, the gas turbine plant 1 includes a plant main body 100 and a gas turbine control device 200.

Hereinafter, a case in which the gas turbine plant 1 is a gas turbine power plant will be described as an example. However, the gas turbine plant 1 is not limited to the gas turbine power plant, and may be any plant in which a gas turbine is provided.

The plant main body 100 operates in accordance with the control of the gas turbine control device 200 to generate a rotational force and generates electric power using the generated rotational force.

Figure 2:
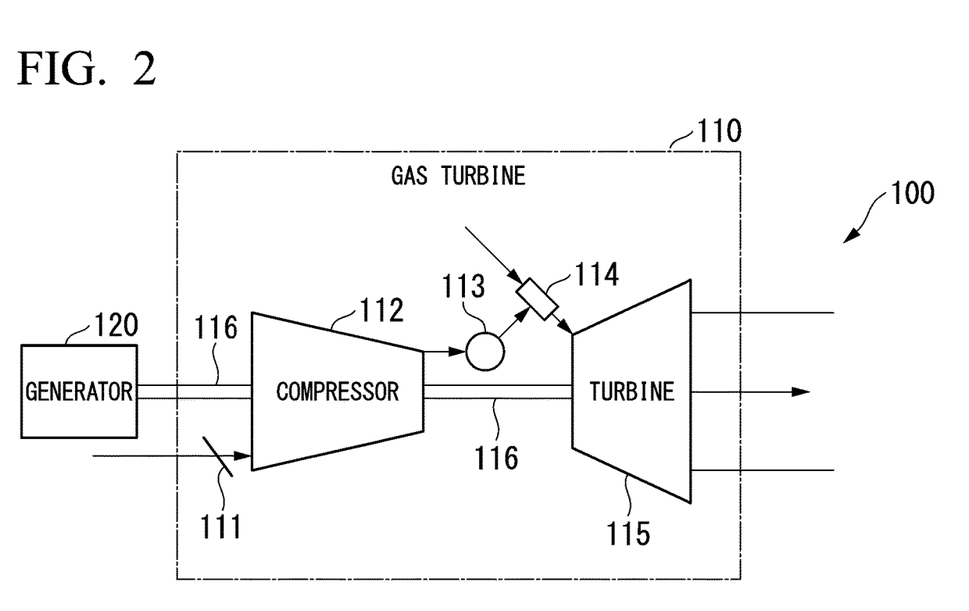
FIG. 2 is a schematic configuration view illustrating a configuration of a plant main body according to the first embodiment.

FIG. 2 is a schematic configuration view illustrating a configuration example of the plant main body 100. In the example of FIG. 2, the plant main body 100 includes a gas turbine 110 and a generator 120. The gas turbine 110 includes an inlet guide vane 111, a compressor 112, a casing 113, a combustor 114, a turbine 115, and a rotating shaft 116.

The gas turbine 110 burns the fuel gas to generate a rotational force.

The compressor 112 takes in and compresses air (atmosphere). The compressed air obtained by the compressor 112 flows into the combustor 114 via the casing 113. The inlet guide vane 111 is provided at an air inlet of the compressor 112. The inlet guide vane 111 adjusts an amount of intake air to the compressor 112 by adjusting a degree of opening of the inlet guide vane 111 in accordance with the control of the gas turbine control device 200.

The combustor 114 mixes the fuel gas supplied from a fuel supply line and the compressed air from the compressor 112 and burns the mixture. The combustion gas generated by the combustion flows into the turbine 115 and hits the vanes of the turbine 115 to rotate the turbine 115.

The turbine 115, the compressor 112 and the generator 120 are connected by the rotating shaft 116. The rotating shaft 116 transmits the rotational force from the turbine 115 to the compressor 112, and the compressor 112 performs compression of air by the rotational force from the turbine 115. Further, the rotating shaft 116 transmits the rotational force from the turbine 115 by the generator 120, and the generator 120 generates the electric power by the rotational force from the turbine 115.

The gas turbine control device 200 controls the plant main body 100. In particular, the gas turbine control device 200 obtains a turbine inlet temperature estimation value in real time, and controls the gas turbine 110 on the basis of the obtained estimation value. The turbine inlet temperature mentioned here is a temperature at the combustion gas inlet of the turbine 115.

The gas turbine control device 200 is configured using, for example, a computer such as an engineering work station (EWS) or a programmable logic controller (PLC).

Figure 3:
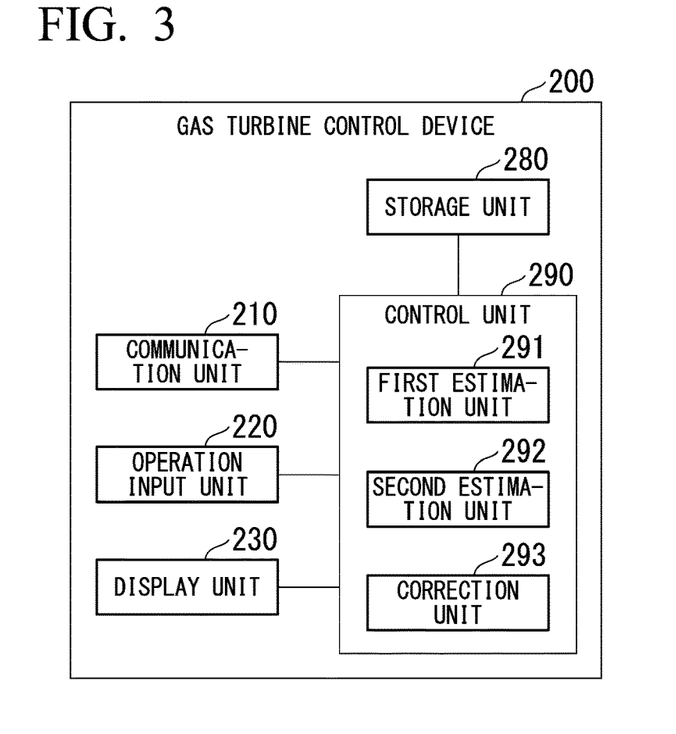
FIG. 3 is a schematic block diagram illustrating a functional configuration of a gas turbine control device according to the first embodiment.

FIG. 3 is a schematic block diagram illustrating a functional configuration of the gas turbine control device 200. As illustrated in FIG. 3, the gas turbine control device 200 includes a communication unit 210, an operation input unit 220, a display unit 230, a storage unit 280, and a control unit 290. The control unit 290 includes a first estimation unit 291, a second estimation unit 292, and a correction unit 293.

The communication unit 210 performs communication with other devices. In particular, the communication unit 210 receives sensor data from each sensor provided in the plant main body 100. Further, the communication unit 210 transmits a control signal to each unit of the plant main body 100.

The operation input unit 220 includes an input device such as, for example, an operation board or a keyboard, or a combination thereof, and receives a user operation.

The display unit 230 includes a display device such as a display screen, for example, a display board or a liquid crystal panel, or a combination thereof, and displays various kinds of information.

The storage unit 280 is configured using a storage device included in the gas turbine control device 200, and stores various types of information.

The control unit 290 controls each unit of the gas turbine control device 200 to execute various functions. The control unit 290 is configured, for example, by a central processing unit (CPU) included in the gas turbine control device 200 reading and executing a program from the storage unit 280.

The first estimation unit 291 estimates a first temperature. The first temperature mentioned here is a turbine inlet temperature estimation value based on a first model. The first model mentioned here is a physical model using a fuel flow rate to the gas turbine. The physical model using the fuel flow rate to the gas turbine mentioned here is a model that receives an input of the fuel flow rate to the gas turbine and calculates a physical amount. A known model can be used as the first model.

The data format of the physical model in the gas turbine control device 200 is not limited to a specific format. For example, the physical model may be illustrated in the form of a mathematical formula such as a function or an equation, or may be illustrated in the form of a table illustrating a correspondence between the input and the output.

A relationship between a change in fuel flow rate and a change in turbine inlet temperature is a relationship in which the turbine inlet temperature changes in accordance with the change in fuel flow rate. Specifically, the flow rate or temperature of the combustion gas obtained by burning the fuel changes in accordance with the change in the fuel flow rate, and the temperature of the turbine inlet warmed by the combustion gas changes. Therefore, when the first estimation unit 291 estimates the turbine inlet temperature using the fuel flow rate to the gas turbine 110, it is possible to estimate the change in the turbine inlet temperature relative to the change in the fuel flow rate without delay. In this respect, the first temperature estimated by the first estimation unit 291 has good responsiveness during a transition when the state of the gas turbine changes.

The first estimation unit 291 may use a physical model indicating the heat balance in the combustor as the first model. For example, the first estimation unit 291 may use a model represented by Formula (1) described in Japanese Unexamined Patent Application, First Publication No. 2005-240608.

[Math. 1]

$$c_{P4} \times V_{cb} \times \gamma_4 \times \frac{dT_4}{dt} = \quad (1)$$
$$c_{Pf} \times G'_f \times T'_f + c_{P3} \times G'_3 \times T'_3 + \eta \times H_f \times G'_f - c_{P4} \times G'_4 \times T_4$$

$c_{P4}$ represents a combustion gas specific heat [kcal/kg° C.].

$V_{cb}$ represents a volume [m³] of a casing to a tail cylinder of the turbine.

$\gamma_4$ represents a combustion gas specific gravity [kg/m³].

$T_4$ represents a turbine inlet temperature [° C.] to be estimated.

t represents a time [sec].

$c_{Pf}$ represents a fuel specific heat [kcal/kg° C.].

$G'_f$ represents a delay-compensated fuel flow rate measurement value [kg/s].

$T'_f$ represents a delay-compensated fuel temperature measurement value [° C.].

$c_{P3}$ represents a casing specific heat [kcal/kg° C.].

$G'_3$ represents a delay-compensated combustor inflow air flow rate measurement value [kg/s]. A calculated value may be used as $G'_3$.

$T'_3$ represents a delay-compensated casing temperature measurement value [° C.].

η represents a combustor thermal efficiency [kcal/kg].

$H_f$ represents a calorific value [kcal/kg].

$G'_4$ represents a delay-compensated turbine inlet combustion gas flow rate [kg/s]. $G'_4 = G'_3 + G'_f$.

η and $V_{cb}$ are design values, which are calculated in the design stage.

The second estimation unit 292 estimates a second temperature. The second temperature mentioned here is a turbine inlet temperature estimation value based on the second model. The second model mentioned here is a physical model using the exhaust gas temperature of the gas turbine. The physical model using the exhaust gas temperature of the gas turbine mentioned here is a model that receives an input of the exhaust gas temperature of the gas turbine and calculates a physical amount. A known model can be used as the second model.

The exhaust gas temperature is a temperature when the combustion gas is discharged from the turbine as exhaust gas via the turbine. Therefore, the turbine inlet temperature and the exhaust gas temperature are temperatures of the combustion gas at the inlet and the outlet of the turbine, respectively, and are strongly correlated with each other. When the second estimation unit 292 estimates the turbine inlet temperature on the basis of the exhaust gas temperature, the turbine inlet temperature (second temperature) can be estimated with high accuracy. In particular, the second temperature is more accurate than the first temperature at stationary times when the state of the gas turbine is constant.

On the other hand, while the turbine inlet temperature is the temperature of the combustion gas before passing through the turbine, since the exhaust gas temperature is the temperature of the combustion gas after passing through the turbine, the exhaust gas temperature changes later than the change in turbine inlet temperature. Furthermore, in general, a delay occurs at the time of temperature measurement by the temperature sensor. In particular, when accurate measurement of the exhaust gas temperature is attempted, the measurement delay is considered to be large. For this reason, the first temperature estimated by the first estimation unit 291 has better responsiveness during a transition, in which the state of the gas turbine changes, than the second temperature estimated by the second estimation unit 292.

The second estimation unit 292 may use a model indicating a heat balance using the exhaust gas temperature of the gas turbine as the second model. Hereinafter, an example of the second model used by the second estimation unit 292 will be described with reference to Formulas (2) to (8).

Work $W_t$ of the turbine is expressed by Formula (2).

[Math. 2]

$$W_t = \Delta H \times G_t \tag{2}$$

ΔH represents a heat drop (an enthalpy difference) in the turbine. $G_t$ represents a turbine passage flow rate (a flow rate of combustion gas passing through the turbine).

The heat drop ΔH in the turbine is expressed by Formula (3).

[Math. 3]

$$\Delta H = H_{1T} - H_{2T} \tag{3}$$

$H_{1T}$ represents an enthalpy of the turbine inlet. $H_{2T}$ represents an enthalpy of the turbine outlet.

Formula (4) is obtained from Formula (2) and Formula (3).

[Math. 4]

$$\frac{W_t}{G_t} = H_{1T} - H_{2T} \tag{4}$$

Formula (4) can be transformed into Formula (5).

[Math. 5]

$$H_{1T} = H_{2T} + \frac{W_t}{G_t} \tag{5}$$

Also, when using a relational expression for converting enthalpy to temperature, the second temperature $T1T_t$, which is a turbine inlet temperature estimation value, is expressed by Formula (6).

[Math. 6]

$$T1T_t = f(H_{1T}) \tag{6}$$

The function f here is a function determined by physical properties. For example, the storage unit 280 stores the function f in advance.

Formula (7) is obtained from Formula (5) and Formula (6).

[Math. 7]

$$T1T_t = f\left(H_{2T} + \frac{W_t}{G_t}\right) \tag{7}$$

The second estimation unit 292 may use the model represented by Formula (7) as the second model. In this case, the second estimation unit 292 calculates the work $W_t$ of the turbine from the generator output Pe on the basis of Formula (8).

[Math. 8]

$$P_e = W_t + W_c + W_{LOSS} \tag{8}$$

$W_c$ represents the work of the compressor, and $W_{LOSS}$ represents a mechanical loss (mecha loss). The second estimation unit 292 obtains the value of $W_c$ and the value of $W_{LOSS}$ by calculation.

In addition, the second estimation unit 292 may use a measured value or a calculated value as the turbine passage flow rate $G_t$ in Formula (7). In addition, the second estimation unit 292 calculates the enthalpy $H_{2T}$ of the turbine outlet on the basis of a known enthalpy calculation method.

The correction unit 293 corrects the first temperature on the basis of the second temperature to calculate the turbine inlet temperature estimation value.

The correction unit 293 may correct the first temperature using a correction coefficient determined on the basis of the ratio of the first temperature to the second temperature. For example, the correction unit 293 may calculate the correction coefficient X on the basis of Formula (9).

[Math. 9]

$$X = \alpha \times \frac{T1T_t}{T1T_f} + (1-\alpha) \times X' \quad (9)$$

α is an adjustment coefficient represented by a constant of 0<α≤1. The value of the adjustment coefficient α is set, for example, in accordance with an input operation performed using the operation input unit 220 by the operator.

$T1T_t$ represents a second temperature. $T1T_f$ represents a first temperature.

X' represents a past value of the correction coefficient X. For example, the value of the correction coefficient X one calculation cycle before may be used as the value of X'.

As illustrated by "$T1T_t/T1T_f$" in Formula (9), the correction coefficient X corresponds to an example of the correction coefficient determined on the basis of the ratio of the first temperature to the second temperature.

The correction unit 293 corrects the first temperature using the correction coefficient X, as illustrated in Formula (10).

[Math. 10]

$$T1T_e = X \times T1T_f \quad (10)$$

$T1T_e$ represents a turbine inlet temperature estimation value.

When Formula (9) is substituted into "X" of Formula (10), Formula (11) is obtained.

[Math. 11]

$$T1T_e = \alpha \times T1T_t + (1-\alpha) \times X' \times T1T_f \quad (11)$$

In Formula (11), weighting is performed by multiplying each of the first temperature $T1T_f$ and the second temperature $T1T_t$ by a coefficient, and these values are summed.

At the time of a transition in which the state of the gas turbine changes, the turbine inlet temperature estimation value $T1T_e$ having better responsiveness than in the case of only the second temperature $T1T_t$ is obtained by the term ("$(1-\alpha) \times X' \times T1T_f$") of the first temperature $T1T_f$.

In addition, at the stationary time in which the state of the gas turbine is constant, the turbine inlet temperature estimation value $T1T_e$ having higher accuracy than that of the case of only the first temperature $T1T_f$ is obtained by the term ("$\alpha \times T1T_t$") of the second temperature $T1T_t$.

Further, since the second temperature $T1T_t$ is reflected in the turbine inlet temperature estimation value $T1T_e$ by the correction unit 293 correcting the first temperature $T1T_f$, it is not necessary to switch the processing between the stationary time and the transition time. This makes it possible to avoid a sudden change in the estimation value with the switching of processing. In addition, because it is not necessary to determine whether the processing is stationary or transient, and it is not necessary to switch processing, the load on the control unit 290 can be lightened.

Here, with reference to FIGS. 4 and 5, the accuracy of the turbine inlet temperature estimation value $T1T_e$ by the gas turbine control device 200 will be described in comparison with the case of estimation based on the heat balance model using the generator output.

Figure 4:
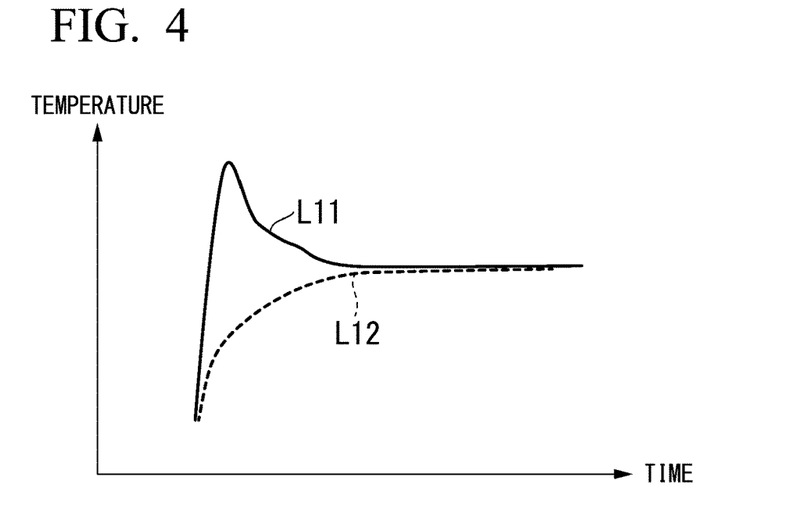
FIG. 4 is a graph illustrating a first example of a turbine inlet temperature estimation value based on a heat balance model using a generator output in the first embodiment.

FIG. 4 is a graph illustrating a first example of the turbine inlet temperature estimation value based on the heat balance model using the generator output. FIG. 4 illustrates an example of the turbine inlet temperature estimation value based on the heat balance model using the generator output at the time of turbine load rise.

The horizontal axis of FIG. 4 represents time. The vertical axis represents temperature.

The line L11 represents an example of the actual value of the turbine inlet temperature. The line L12 represents an example of the turbine inlet temperature estimation value based on the heat balance model using the generator output. As estimation of the turbine inlet temperature based on the heat balance model using the generator output, for example, a GT output measurement value, an atmospheric temperature measurement value, and an IGV opening degree command value may be applied to heat balance data to estimate the turbine inlet temperature estimation value.

The combustion gas flowing into the turbine hits the moving vanes of the turbine to rotate the moving vanes and the rotating shaft, and the generator generates electric power by the rotational force transmitted to the generator by the rotating shaft. For this reason, a delay such as a delay due to inertia of the rotating shaft or the like occurs from the change in the turbine inlet temperature to the change in the generator output. Therefore, as in the example of FIG. 4, in the estimation of the turbine inlet temperature based on the heat balance model using the generator output, the change in the estimation value of the turbine inlet temperature is later than the change in the actual value.

In contrast, as described above, in the gas turbine control device 200, by reflecting the first temperature $T1T_f$ based on the fuel flow rate in the turbine inlet temperature estimation value $T1T_e$, higher responsiveness can be obtained than in a case of estimating the turbine inlet temperature on the basis of the heat balance model using the generator output. In this respect, in the gas turbine control device 200, it is possible to estimate the turbine inlet temperature with high accuracy even at the time of transition, as compared to the case of estimating the turbine inlet temperature based on the heat balance model using the generator output.

Figure 5:
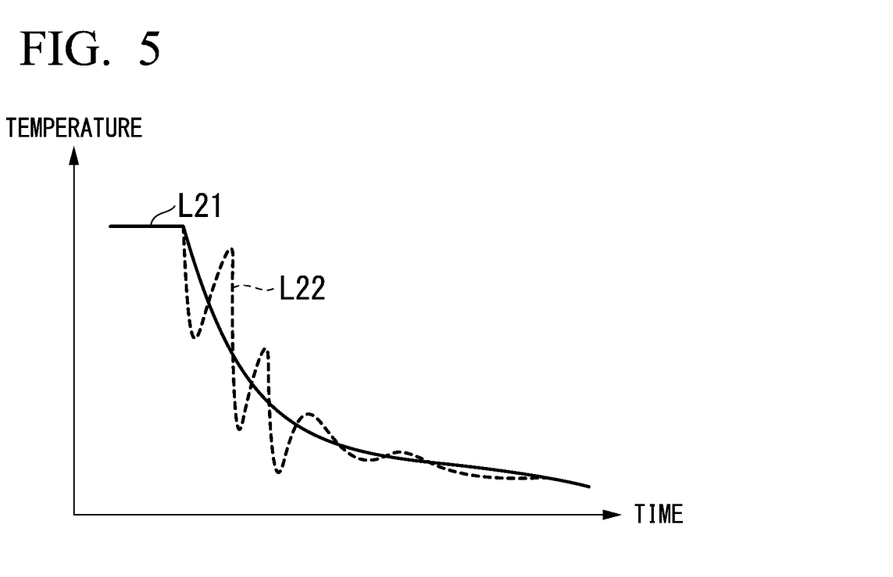
FIG. 5 is a graph illustrating a second example of turbine inlet temperature estimation value based on the heat balance model using a generator output in the first embodiment.

FIG. 5 is a graph illustrating a second example of the turbine inlet temperature estimation based on the heat balance model using the generator output. FIG. 5 illustrates an example of the turbine inlet temperature estimation value based on the heat balance model using the generator output at the time of turbine load drop.

The horizontal axis of FIG. 5 represents time. The vertical axis represents temperature.

The line L21 represents an example of the actual value of the turbine inlet temperature. The line L22 illustrates an example of a turbine inlet temperature estimation value based on the heat balance model using the generator output.

When the generator output changes, in some cases, the generator output may vibrate due to a relationship with the electric power system. Therefore, as in the example of FIG. 5, it is considered that the turbine inlet temperature estimation value based on the heat balance model using the generator output vibrates. On the other hand, this vibration is due to the relationship between the generator and the power system, and it is considered that the turbine inlet temperature changes without vibration as in the example of FIG. 5.

When the gas turbine is controlled using the turbine inlet temperature estimation value that is greatly different from the actual turbine inlet temperature, tripping due to misfire or damage to the combustor due to combustion oscillation may occur.

In contrast, as described above, in the gas turbine control device 200, the influence due to vibration of the generator output can be avoided or reduced, by reflecting the first temperature $T1T_f$ based on the fuel flow rate in the turbine inlet temperature estimation value $T1T_e$. In this respect, in the gas turbine control device 200, it is possible to estimate the turbine inlet temperature with higher accuracy even at the time of transition, as compared to the case of estimating the turbine inlet temperature based on the heat balance model using the generator output.

Further, the correction performed by the correction unit 293 is not limited to those illustrated in Formulas (10) and (11). As the correction performed by the correction unit 293, it is possible to use various corrections that ensure responsiveness at the time of transition on the basis of the first temperature and obtain accuracy at the stationary time on the basis of the second temperature.

For example, the correction unit 293 may estimate the turbine inlet temperature estimation value $T1T_e$ on the basis of Formula (12).

[Math. 12]

$$T1T_e = T1T_f + T1T_t - LAG(T1T_f) \tag{12}$$

Here, LAG is a function representing a first-order lag element.

Figure 6:
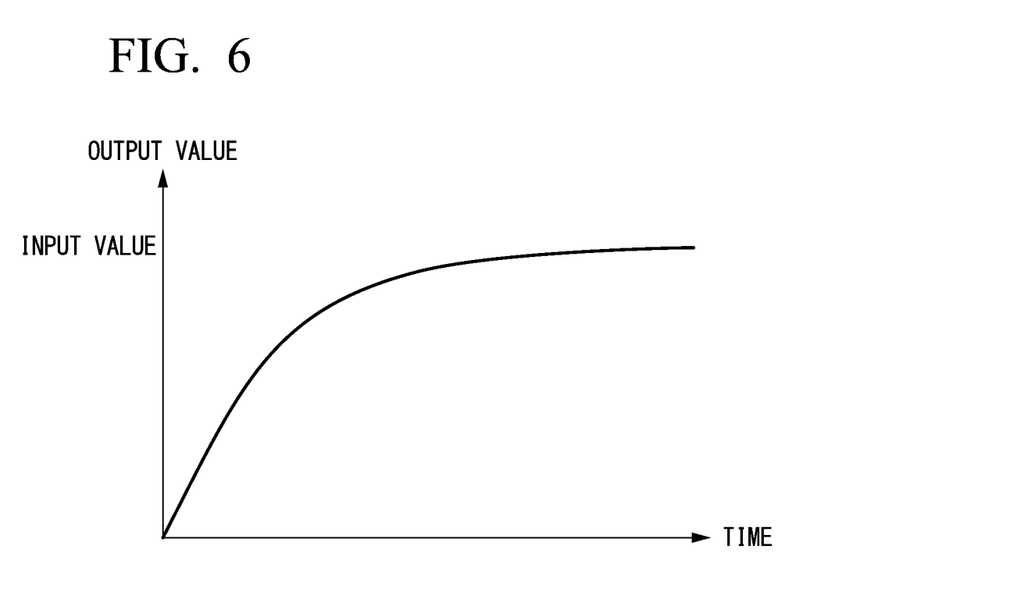
FIG. 6 is a graph illustrating an example of a value of a function LAG according to the first embodiment.

FIG. 6 is a graph illustrating an example of the value of the function LAG. FIG. 6 illustrates the value of the function LAG of the case in which the input value to the function LAG is constant with respect to the time.

As in the example of FIG. 6, the output value of the function LAG approaches the input value with passage of the time. In Formula (12), another function in which the output value approaches the input value with passage of the time may be used instead of the function LAG. The same also applies to Formula (13) to be described below.

In Formula (12), at the stationary time, the value of the function LAG becomes the first temperature $T1T_f$, and the turbine inlet temperature estimation value $T1T_e$ becomes equal to the second temperature $T1T_t$. As a result, the turbine inlet temperature estimation value $T1T_e$ at the stationary time can be estimated with higher accuracy.

Further, in Formula (12), at the time of transition, a delay occurs in the change in the value of the function LAG, and the change in the first temperature $T1T_f$ is reflected on the turbine inlet temperature estimation value $T1T_e$. As a result, it is possible to ensure the responsiveness of the turbine inlet temperature estimation value $T1T_e$ at the time of transition.

In this way, when the correction unit 293 estimates the turbine inlet temperature estimation value $T1T_e$ using Formula (12), it is possible to ensure responsiveness for estimation of the turbine inlet temperature and to improve the estimation accuracy.

Alternatively, the correction unit 293 may estimate the turbine inlet temperature estimation value $T1T_e$ on the basis of Formula (13).

[Math. 13]

$$T1T_e = \frac{T1T_f \times T1T_t}{LAG(T1T_f)} \tag{13}$$

In Formula (13), at the stationary time, the value of the function LAG becomes the first temperature $T1T_f$, and the turbine inlet temperature estimation value $T1T_e$ becomes equal to the second temperature $T1T_t$. As a result, the turbine inlet temperature estimation value $T1T_e$ at the stationary time can be estimated with higher accuracy.

Further, in Formula (13), at the time of transition, a delay occurs in the change of the value of the function LAG, and the change of the first temperature $T1T_f$ is reflected on the turbine inlet temperature estimation value $T1T_e$. As a result, it is possible to ensure the responsiveness of the turbine inlet temperature estimation value $T1T_e$ at the time of transition.

In this way, when the correction unit 293 estimates the turbine inlet temperature estimation value $T1T_e$ using Formula (13), it is possible to ensure responsiveness for estimation of the turbine inlet temperature and to improve the estimation accuracy.

Alternatively, the correction unit 293 may estimate the turbine inlet temperature estimation value $T1T_e$ on the basis of Formula (14).

[Math. 14]

$$T1T_e = T1T_f + LAG(T1T_t - T1T_f) \tag{14}$$

In Formula (14), at the stationary time, the value of the function LAG becomes a value obtained by subtracting the first temperature $T1T_f$ from the second temperature $T1T_t$ ("$T1T_t - T1T_f$"), and the turbine inlet temperature estimation value $T1T_e$ becomes equal to the second temperature $T1T_t$. As a result, the turbine inlet temperature estimation value $T1T_e$ at the stationary time can be estimated with higher accuracy.

Further, in Formula (14), at the time of transition, a delay occurs in the change of the value of the function LAG, and the change of the first temperature $T1T_f$ is reflected on the turbine inlet temperature estimation value $T1T_e$. As a result, it is possible to ensure the responsiveness of the turbine inlet temperature estimation value $T1T_e$ at the time of transition.

In this way, when the correction unit 293 estimates the turbine inlet temperature estimation value $T1T_e$ using Formula (14), it is possible to ensure responsiveness for estimation of the turbine inlet temperature and to improve the estimation accuracy.

Alternatively, the correction unit 293 may estimate the turbine inlet temperature estimation value $T1T_e$ on the basis of Formula (15).

[Math. 15]

$$T1T_e = T1T_f \times LAG\left(\frac{T1T_t}{T1T_f}\right) \tag{15}$$

"LAG ($T1T_t/T1T_f$)" of the Formula (15) corresponds to an example of the correction coefficient determined on the basis of the ratio of the first temperature to the second temperature.

In Formula (15), at the stationary time, the value of the function LAG becomes a value ("$T1T_t/T1T_f$") obtained by dividing the second temperature $T1T_t$ by the first temperature $T1T_f$, and the turbine inlet temperature estimation value $T1T_e$ becomes equal to the second temperature $T1T_t$. As a result, it is possible to estimate the turbine inlet temperature estimation value $T1T_e$ at the stationary time with higher accuracy.

Further, in Formula (15), at the time of transition, a delay occurs in the change of the value of the function LAG, and the change of the first temperature $T1T_f$ is reflected on the turbine inlet temperature estimation value $TIT_e$. As a result, it is possible to ensure the responsiveness of the turbine inlet temperature estimation value $T1T_e$ at the time of transition.

In this way, when the correction unit 293 estimates the turbine inlet temperature estimation value $T1T_e$ using Formula (15), it is possible to ensure responsiveness for estimation of the turbine inlet temperature and to improve the estimation accuracy.

Figure 7:
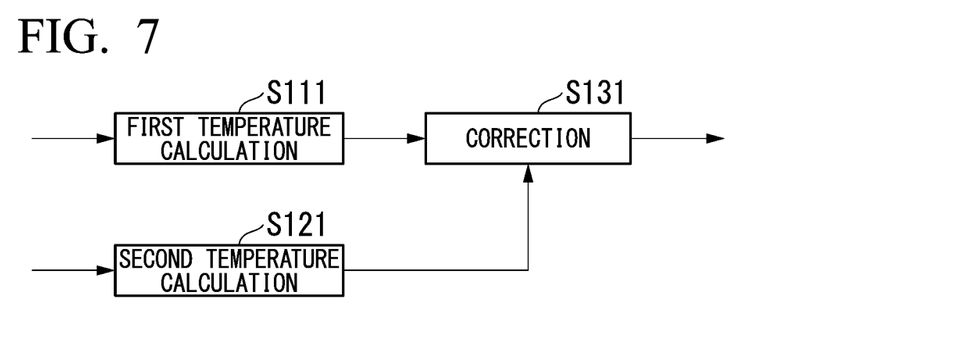
FIG. 7 is a diagram illustrating an example of a processing procedure in which the gas turbine control device according to the first embodiment obtains a turbine inlet temperature estimation value.

Next, the operation of the gas turbine control device 200 will be described with reference to FIG. 7. FIG. 7 is a diagram illustrating an example of a processing procedure in which the gas turbine control device 200 obtains a turbine inlet temperature estimation value. The gas turbine control device 200 repeats the processing of FIG. 7, for example, at predetermined intervals.

In the example of FIG. 7, the first estimation unit 291 calculates the first temperature using the first model (step S111). In addition, the second estimation unit 292 calculates a second temperature using the second model (step S121). The first estimation unit 291 and the second estimation unit 292 may execute the processing in step S111 and the processing in step S121 in parallel or sequentially.

The correction unit 293 corrects the first temperature obtained in step S111 on the basis of the second temperature obtained in step S121 (step S131).

After step S131, the processing of FIG. 7 ends.

As described above, the first estimation unit 291 estimates the first temperature $T1T_f$, which is a turbine inlet temperature estimation value based on the first model that is a physical model using the fuel flow rate to the gas turbine 110. The second estimation unit 292 estimates a second temperature $T1T_t$ that is a turbine inlet temperature estimation value based on a second model that is a physical model using the exhaust gas temperature of the gas turbine 110. The correction unit 293 corrects the first temperature on the basis of the second temperature to calculate the turbine inlet temperature estimation value $T1T_e$.

In the gas turbine control device 200, the responsiveness of the turbine inlet temperature estimation value $T1T_e$ can be ensured in that the first temperature $T1T_f$ based on the fuel flow rate is used. Further, in the gas turbine control device 200, it is possible to estimate the turbine inlet temperature estimation value $T1T_e$ with high accuracy in that the second temperature $T1T_t$ based on the exhaust gas temperature is used.

In this way, according to the gas turbine control device 200, it is possible to ensure responsiveness for estimation of the turbine inlet temperature and to improve the estimation accuracy.

Further, since the second temperature $T1T_t$ is reflected on the turbine inlet temperature estimation value $T1T_e$ by correcting the first temperature $T1T_f$ by the correction unit 293, it is not necessary to switch the processing between the stationary time and the transition time. This makes it possible to avoid a sudden change in the estimation value accompanying the switching of processing. In addition, because it is not necessary to determine whether the processing is stationary or transient, and it is not necessary to switch processing, the load on the control unit 290 can be lightened.

For example, the first estimation unit 291 estimates the first temperature on the basis of the first model indicating the heat balance in the combustor 114. The second estimation unit 292 estimates the second temperature on the basis of the second model indicating heat balance using the exhaust gas temperature of the turbine 115. The correction unit 293 corrects the first temperature using the correction coefficient determined on the basis of ratio of the first temperature to the second temperature.

Thus, according to the gas turbine control device 200, as described above, responsiveness for estimation of the turbine inlet temperature can be ensured, and estimation accuracy can be enhanced. Further, according to the gas turbine control device 200, as described above, it is not necessary to switch the process between the stationary time and the transition time, and it is possible to avoid a sudden change of the estimation value accompanying the switching of the process. In addition, because it is not necessary to determine whether the processing is stationary or transient, and it is not necessary to switch processing, the load on the control unit 290 can be light.

Second Embodiment

The gas turbine control device may correct the estimation value to be input to the first model. This will be described in the second embodiment.

Figure 8:
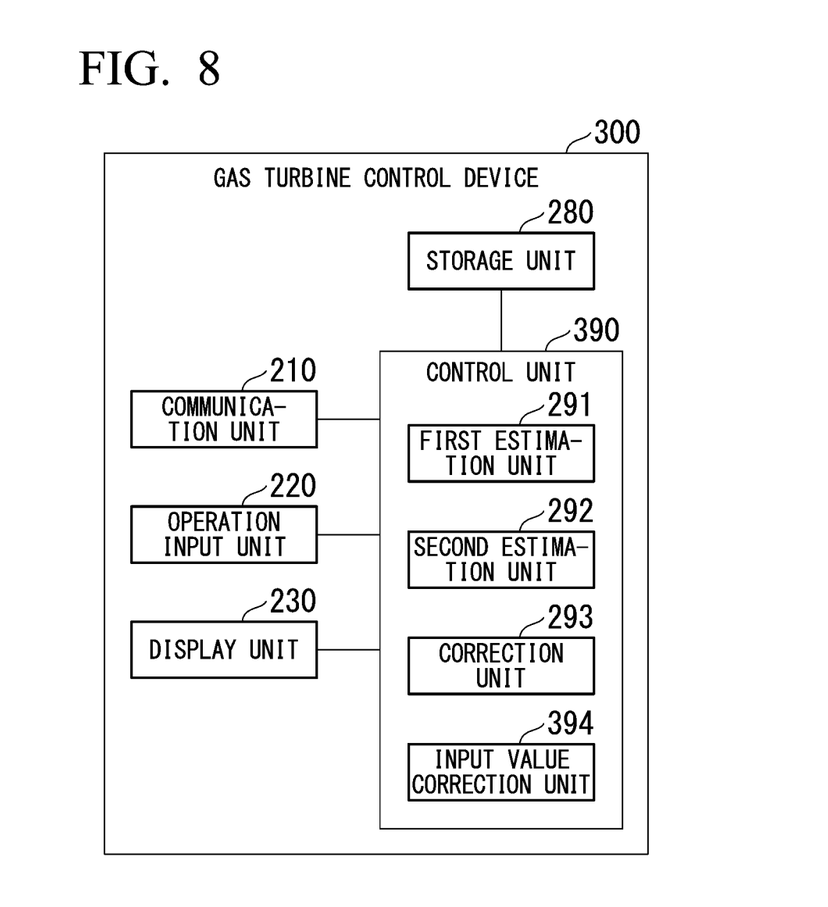
FIG. 8 is a schematic block diagram illustrating a functional configuration of a gas turbine control device according to a second embodiment.

FIG. 8 is a schematic block diagram illustrating a functional configuration of a gas turbine control device according to a second embodiment. As illustrated in FIG. 8, the gas turbine control device 300 includes a communication unit 210, an operation input unit 220, a display unit 230, a storage unit 280, and a control unit 390. The control unit 390 includes a first estimation unit 291, a second estimation unit 292, a correction unit 293, and an input value correction unit 394.

Among the respective units of FIG. 8, parts corresponding to and having the same functions as the respective units of FIG. 3 are denoted by the same reference numerals (210, 220, 230, 280, 291, 292, and 293), and the description thereof is omitted. The gas turbine control device 300 differs from the case of the gas turbine control device 200 in that the control unit 390 includes the input value correction unit 394. Otherwise the gas turbine control device 300 is the same as that of the case of the gas turbine control device 200. In the configuration of FIG. 1, the gas turbine control device 300 can be used instead of the gas turbine control device 200.

The input value correction unit 394 corrects at least one of the estimation values to be input to the first model, using the estimation value obtained by the calculation using the second model.

Here, among the values to be input to the first model, the values obtained by calculation, such as the fuel flow rate and the air flow rate, may include errors with respect to the actual values. As in the case of the turbine inlet temperature, it is considered that the values obtained in the calculation process of the second model have higher accuracy at the stationary time also about the input to the first models.

Therefore, the input value correction unit 394 performs a correction that reflects the value obtained in the calculation process of the second model on the stationary time also about the value to be input to the first model, as described for the correction of the turbine inlet temperature.

Thus, in the gas turbine control device 300, the estimation accuracy of the turbine inlet temperature can be further enhanced.

Figure 9:
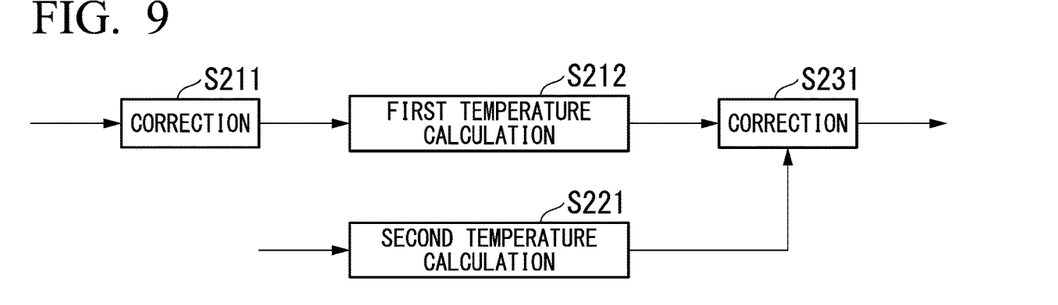
FIG. 9 is a view illustrating an example of a processing procedure in which the gas turbine control device according to the second embodiment calculates a turbine inlet temperature estimation value.

Next, the operation of the gas turbine control device 300 will be described with reference to FIG. 9. FIG. 9 is a diagram illustrating an example of a processing procedure in which the gas turbine control device 300 calculates a turbine inlet temperature estimation value. The gas turbine control device 300 repeats the processing of FIG. 7, for example, at predetermined intervals.

In the example of FIG. 9, the input value correction unit 394 corrects at least one of the estimation values to be input to the first model, using the estimation value obtained by the calculation using the second model (step S211).

Steps S212, S221, and S231 are the same as steps S111, S121, and S131 of FIG. 7, respectively.

After step S231, the processing of FIG. 9 ends.

As described above, the input value correction unit 394 corrects at least one of the estimation values to be input to the first model, using the estimation value obtained by the calculation using the second model.

In this way, in the gas turbine control device 300, the estimation accuracy of the turbine inlet temperature can be further enhanced.

In any of the first embodiment and the second embodiment, a computer that performs the processing of the first estimation unit 291 and a computer that performs the processing of the second estimation unit 292 may be the same computer, or may be separate computers.

Here, it is expected that the calculation of the first temperature using the first model does not require repeated calculation and the processing load is relatively light.

On the other hand, in the case of the calculation of the second temperature using the second model, it is considered that the processing load is relatively heavy because repetitive calculations are included. Therefore, when the processing of the second estimation unit 292 is executed using a general control device, there is a possibility that the calculation may not be completed within the control period.

Therefore, a computer for executing the processing of the second estimation unit 292 may be prepared separately from the control device, and the second temperature calculated by the computer may be taken into the correction unit 293.

Further, by recording a program for realizing all or part of functions of the control unit 290 or 390 in a computer-readable recording medium, and by reading the program recorded in the recording medium by the computer system and executing the program, processing of each unit may be performed. Here, the "computer system" mentioned here includes an OS and hardware such as peripheral devices.

The "computer system" also includes a homepage providing environment (or display environment) if a WWW system is used.

The "computer-readable recording medium" refers to a portable medium such as a flexible disk, a magneto-optical disk, a ROM, or a CD-ROM, or a storage device such as a hard disk built in a computer system. The aforementioned program may be for realizing some of the functions described above, or may be realized in combination with the program in which the functions described above have already been recorded in the computer system.

The embodiments of the present invention have been described in detail with reference to the drawings, but the specific configuration is not limited to this embodiment, and design changes and the like within the scope of the present invention are also included.

INDUSTRIAL APPLICABILITY

An embodiment of the present invention relates to a gas turbine control device which includes a first estimation unit configured to estimate a first temperature which is a turbine inlet temperature estimation value based on a first model which is a physical model using a fuel flow rate to a gas turbine, a second estimation unit configured to estimate a second temperature which is a turbine inlet temperature estimation value based on a second model which is a physical model using an exhaust gas temperature of the gas turbine, and a correction unit configured to correct the first temperature on the basis of the second temperature to calculate a turbine inlet temperature estimation value.

According to this embodiment, responsiveness for estimation of turbine inlet temperature can be ensured, and the estimation accuracy can be enhanced.

REFERENCE SIGNS LIST

1 Gas turbine plant
100 Plant main body
110 Gas turbine
111 Inlet guide vane
112 Compressor
113 Casing
114 Combustor
115 Turbine
116 Rotating shaft
120 Generator
200, 300 Gas turbine control device
210 Communication unit
220 Operation input unit
230 Display unit
280 Storage unit
290, 390 Control unit
291 First estimation unit
292 Second estimation unit
293 Correction unit
394 Input value correction unit

The invention claimed is:

1. A gas turbine control device comprising:
   a first estimation unit configured to estimate a first temperature which is a first turbine inlet temperature estimation value based on a first model which is a physical model using a fuel flow rate to a gas turbine;
   a second estimation unit configured to estimate a second temperature which is a second turbine inlet temperature estimation value based on a second model which is a physical model using an exhaust gas temperature of the gas turbine;
   an input value correction unit configured to correct the first turbine inlet temperature estimation value to be input to the first model using the second turbine inlet temperature estimation value obtained by calculation using the second model; and
   a correction unit configured to correct the first temperature based on the second temperature to calculate a third turbine inlet temperature estimation value.

2. The gas turbine control device according to claim 1, wherein:
   the first estimation unit is configured to estimate the first temperature based on the first model indicating a heat balance in a combustor;
   the second estimation unit is configured to estimate the second temperature based on the second model indicating a heat balance using the exhaust gas temperature of the gas turbine; and
   the correction unit is configured to correct the first temperature using a correction coefficient determined based on a ratio between the first temperature and the second temperature.

3. A gas turbine plant comprising the gas turbine control device according to claim 1.

4. The gas turbine control device according to claim 1, wherein the second turbine inlet temperature estimation value is an estimation value on stationary time when a state of the gas turbine is constant.

5. The gas turbine control device according to claim 4, wherein the second turbine inlet temperature estimation value is an estimation value of the fuel flow rate or an estimation value of an air flow rate.

6. The gas turbine control device according to claim 4, wherein:
   the first estimation unit is configured to estimate the first temperature based on the first model indicating a heat balance in a combustor;
   the second estimation unit is configured to estimate the second temperature based on the second model indicating a heat balance using the exhaust gas temperature of the gas turbine; and
   the correction unit is configured to correct the first temperature using a correction coefficient determined based on a ratio between the first temperature and the second temperature.

7. The gas turbine control device according to claim 5, wherein:
   the first estimation unit is configured to estimate the first temperature based on the first model indicating a heat balance in a combustor;
   the second estimation unit is configured to estimate the second temperature based on the second model indicating a heat balance using the exhaust gas temperature of the gas turbine; and
   the correction unit is configured to correct the first temperature using a correction coefficient determined based on a ratio between the first temperature and the second temperature.

8. A gas turbine plant comprising the gas turbine control device according to claim 2.

9. A gas turbine plant comprising the gas turbine control device according to claim 4.

10. A gas turbine plant comprising the gas turbine control device according to claim 5.

11. A gas turbine plant comprising the gas turbine control device according to claim 6.

12. A gas turbine plant comprising the gas turbine control device according to claim 7.

* * * * *